United States Patent
Yamamoto

[11] Patent Number: 5,991,276
[45] Date of Patent: Nov. 23, 1999

[54] VIDEOCONFERENCE SYSTEM

[75] Inventor: Kunio Yamamoto, Kawasaki, Japan

[73] Assignee: Fujitsu Limited, Kanagawa, Japan

[21] Appl. No.: 08/844,788

[22] Filed: Apr. 21, 1997

[30] Foreign Application Priority Data

Nov. 19, 1996 [JP] Japan ................................. 8-307604

[51] Int. Cl.[6] .................................................. H04Q 11/04
[52] U.S. Cl. ........................................................ 370/260
[58] Field of Search .................................... 370/260, 259,
370/261, 263, 262, 270, 389, 395, 400,
401, 447, 462, 465, 535, 537, 464, 352;
379/207, 202, 204; 348/15, 14, 17, 20,
13, 16, 383, 388, 469, 474, 441; 375/211

[56] References Cited

U.S. PATENT DOCUMENTS

| | | | |
|---|---|---|---|
| 5,548,322 | 8/1996 | Zhou | 348/14 |
| 5,574,778 | 11/1996 | Ely et al. | 379/207 |
| 5,680,392 | 10/1997 | Semaan | 379/204 |

FOREIGN PATENT DOCUMENTS

| | | |
|---|---|---|
| 61-61581 | 3/1986 | Japan . |
| 61-79388 | 4/1986 | Japan . |
| 63-138893 | 6/1988 | Japan . |
| 63-203079 | 8/1988 | Japan . |
| 2-100490 | 4/1990 | Japan . |
| 2-145097 | 6/1990 | Japan . |
| 4-46390 | 2/1992 | Japan . |
| 4-192838 | 7/1992 | Japan . |
| 6-141310 | 5/1994 | Japan . |
| 6-178295 | 6/1994 | Japan . |
| 6-217302 | 8/1994 | Japan . |
| 6-276295 | 9/1994 | Japan . |
| 7-177482 | 7/1995 | Japan . |
| 2 306 850 | 5/1997 | United Kingdom . |
| 2 312 810 | 11/1997 | United Kingdom . |
| WO 94/24803 | 10/1994 | WIPO . |

*Primary Examiner*—Dang Ton
*Attorney, Agent, or Firm*—Helfgott & Karas, P.C.

[57] ABSTRACT

A multipoint videoconference system which efficiently delivers video and voice information along with various types of material data to realize a more realistic teleconferencing environment. The system comprises a plurality of videoconference terminals, a videoconference server, and a videoconference administration server. Each videoconference terminal transmits a video signal, a voice signal, and a material data signal over an ATM network. The videoconference server rearranges the video signals, the voice signals, and the material data signals received from the plurality of videoconference terminals. It sends the rearranged signals back to the videoconference terminals via the ATM network. The videoconference administration server controls network connections between the videoconference server and the videoconference terminals.

11 Claims, 16 Drawing Sheets

| DATA TABLE | | | | | | | | |
|---|---|---|---|---|---|---|---|---|
| SERVER NUMBER | SERVER ATM-ADDRESS | SERVER USAGE STATUS | MAXIMUM SIMULTANEOUS CHANNELS | RESERVATION START TIME | RESERVATION END TIME | RESERVED CHANNELS | RESERVED USER TERMINAL ATM-ADDRESS | CONNECTION STATUS |
| XX | XXXXXXXXXX | IN-USE/VACANT | XX | X/XX/XX-XX:XX:XX | X/XX/XX-XX:XX:XX | XX | XXXXXXXXXX<br>XXXXXXXXXX<br>XXXXXXXXXX<br>XXXXXXXXXX | Rsrv/Busy<br>Rsrv/Busy<br>Rsrv/Busy<br>Rsrv/Busy |

FIG. 9

VIDEOCONFERENCE SYSTEM

BACKGROUND OF THE INVENTION

1. Field of the Invention

The present invention relates to multipoint videoconference systems, and more particularly, to a videoconference system, as well as to its constituent devices, in which a plurality of videoconference terminals, a videoconference server, and a videoconference administration server are interconnected via an ATM network.

2. Description of Related Art

Videoconference systems provide both voice and video communications between remotely located multiple parties. One of the key aspects of today's increasing market demands for videoconference systems is the provision of more realistic conference environments with a greater channel bandwidth.

Conventional videoconference systems realize multipoint teleconferencing by using the ITU-T H.261 videoconferencing coding standards and the narrow band ISDN (N-ISDN) communication channels for signal transmission. In such systems, audio and video information is transferred between a plurality of conference rooms over a single or multiple 64 kbps ISDN transmission channels.

However, the quality of video information reproduced at the receiving ends is not satisfactory at all because of its slow frame rate. The conventional systems are unable to represent detailed expression and smooth motion of participants of a conference.

Furthermore, the conventional videoconference can only send voice and video information, but during the session of a videoconference, it cannot transfer materials such as text, photos, illustrations, and graphs that the participants prepared for the conference. Although it is possible to transmit visual images of such documents via the video camera, instead of sending pictures of the participants, the system does not support realtime distribution of material data in the middle of a conference concurrently with the audio and video information.

The above-described problems may be solved by adding more capacity, or bandwidth, to the communications channels allocated. However, this cannot be a practical solution because it will cause an unacceptably high communication cost.

Delivery of a variety of reference materials, particularly when it occurs concurrently with the voice and video information, will require separate channels having different bandwidths each suitable for their properties. However, such a system is not feasible because it leads to inefficient usage of communication channels in the existing network technologies. Therefore, new videoconference systems that meet the above-described requirements have been demanded.

SUMMARY OF THE INVENTION

Taking the above into consideration, an object of the present invention is to provide a multipoint videoconference system which efficiently delivers video and voice information along with various types of material data to realize a more realistic teleconferencing environment.

To accomplish the above object, according to the present invention, there is provided a multipoint videoconference system. This system comprises: a plurality of videoconference terminals each of which transmits a video signal, a voice signal, and a material data signal over an ATM network; a videoconference server which rearranges the video signals, the voice signals, and the material data signals received from the plurality of videoconference terminals and sends the rearranged signals back to the plurality of videoconference terminals via the ATM network; and a videoconference administration server which controls network connections between the video-conference server and the plurality of videoconference terminals.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 9 is a diagram illustrating the content of a data table;

DESCRIPTION OF THE PREFERRED EMBODIMENT

An embodiment of the present invention will be described below with reference to the accompanying drawings.

Figure 1:
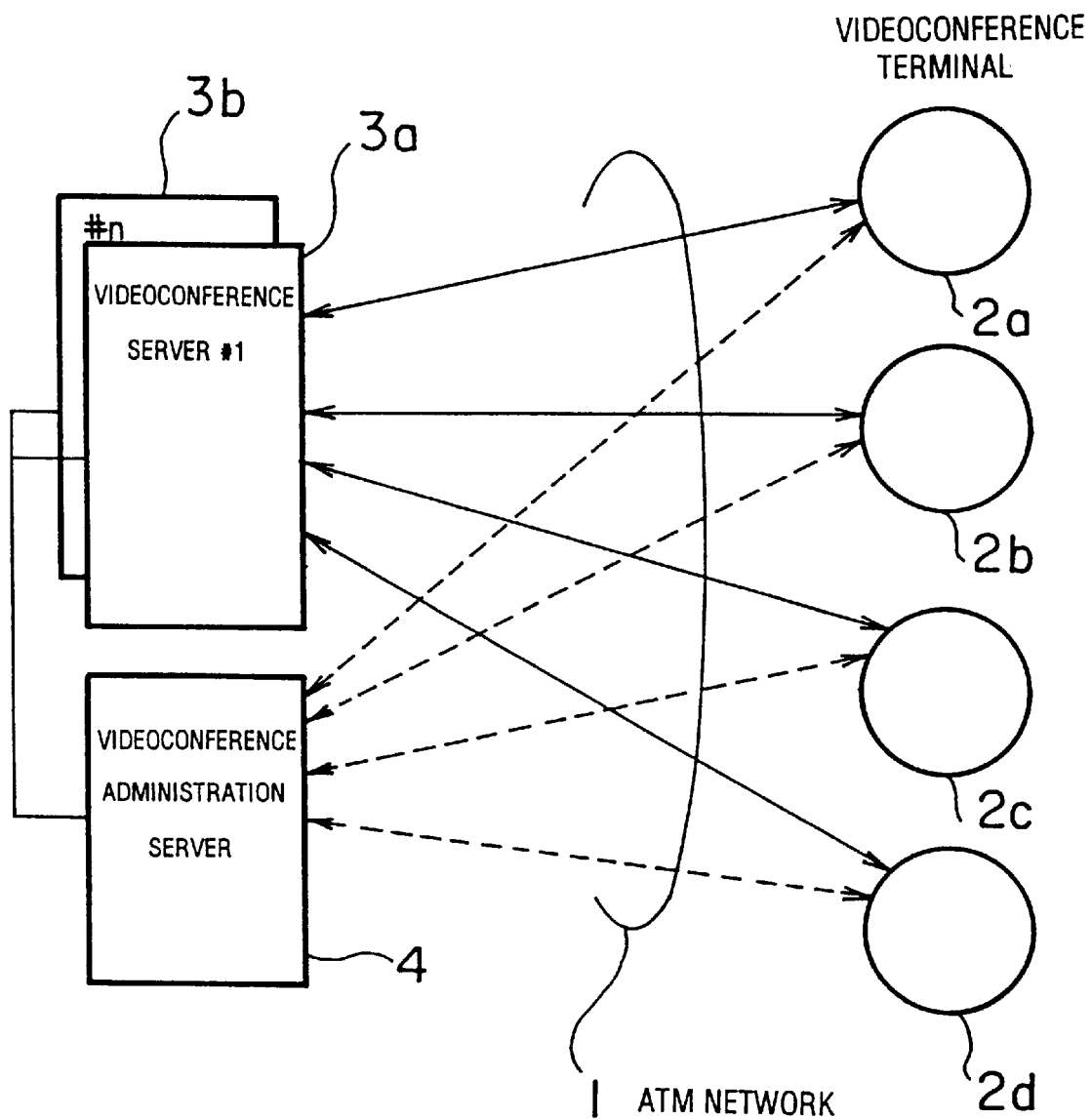
FIG. 1 is a conceptual view of the present invention.

Referring first to FIG. 1, the following will explain the concept of the embodiment of the present invention. According to the present invention, the videoconference system comprises: a plurality of videoconference terminals 2a–2d each of which transmits a video signal, a voice signal, and a material data signal over an ATM network 1; videoconference servers 3a and 3b which rearrange the video signals, the voice signals, and the material data signals received from the plurality of videoconference terminals 2a–2d and sends the rearranged signals back to the plurality of videoconference terminals 2a–2d via the ATM network 1; and a videoconference administration server 4 which controls network connections between the videoconference servers 3a and 3b and the plurality of videoconference terminals 2a–2d.

Assume here that, in the above-described structural arrangement, one of the plurality of videoconference terminals 2a–2d is attempting to make a reservation for a videoconference. In response to this reservation request, the videoconference administration server 4 chooses an idle videoconference server, say 3a, from among the plurality of videoconference servers 3a and 3b available in the system and draws up a schedule to open the requested videoconference. Just before the planned opening time, the videoconference administration server 4 sends to the videoconference terminals, say 2a–2d, that are scheduled to take part of the conference some information necessary for setting up a connection to the reserved videoconference server 3a. Based on this information provided by the videoconference administration server 4, the videoconference terminals 2a–2d will set up a connection with the videoconference server 3a via the ATM network 1. The videoconference terminals 2a–2d interact with the videoconference server 3a by transmitting and receiving heterogeneous data signals including video, voice, material data signals, and the edited version of them, which signal transmission is actually performed by using ATM cells.

With statistic multiplexing techniques adaptive to the nature of each traffic, ATM networks can handle a variety of different information traffic in an integrated way, thus allowing the limited network bandwidth to be used quite efficiently. It is therefore possible to transmit a large amount of video data at a relatively low cost, and in parallel to this video data transmission, various kinds of conference materials can be transferred through separate communications channels. The videoconference terminals 2a–2d will provide the participants in a conference with more detailed visual information including their facial expressions. The videoconference servers 3a and 3b receives the portrait images of all participants from the videoconference terminals 2a–2d and rearranges them so that they will fit into the same screen. The well-arranged screen image is then delivered to the terminals, which provides the participants with a feeling of taking part in the conference. With the material transfer facility according to the present invention, the participants can show their materials to the remote screens while concurrently maintaining the video connection. This feature realizes a more realistic videoconference environment, where the participants will feel as if all the members gathered together under one roof.

The embodiment of the present invention will be described in more detail below.

Figure 2:
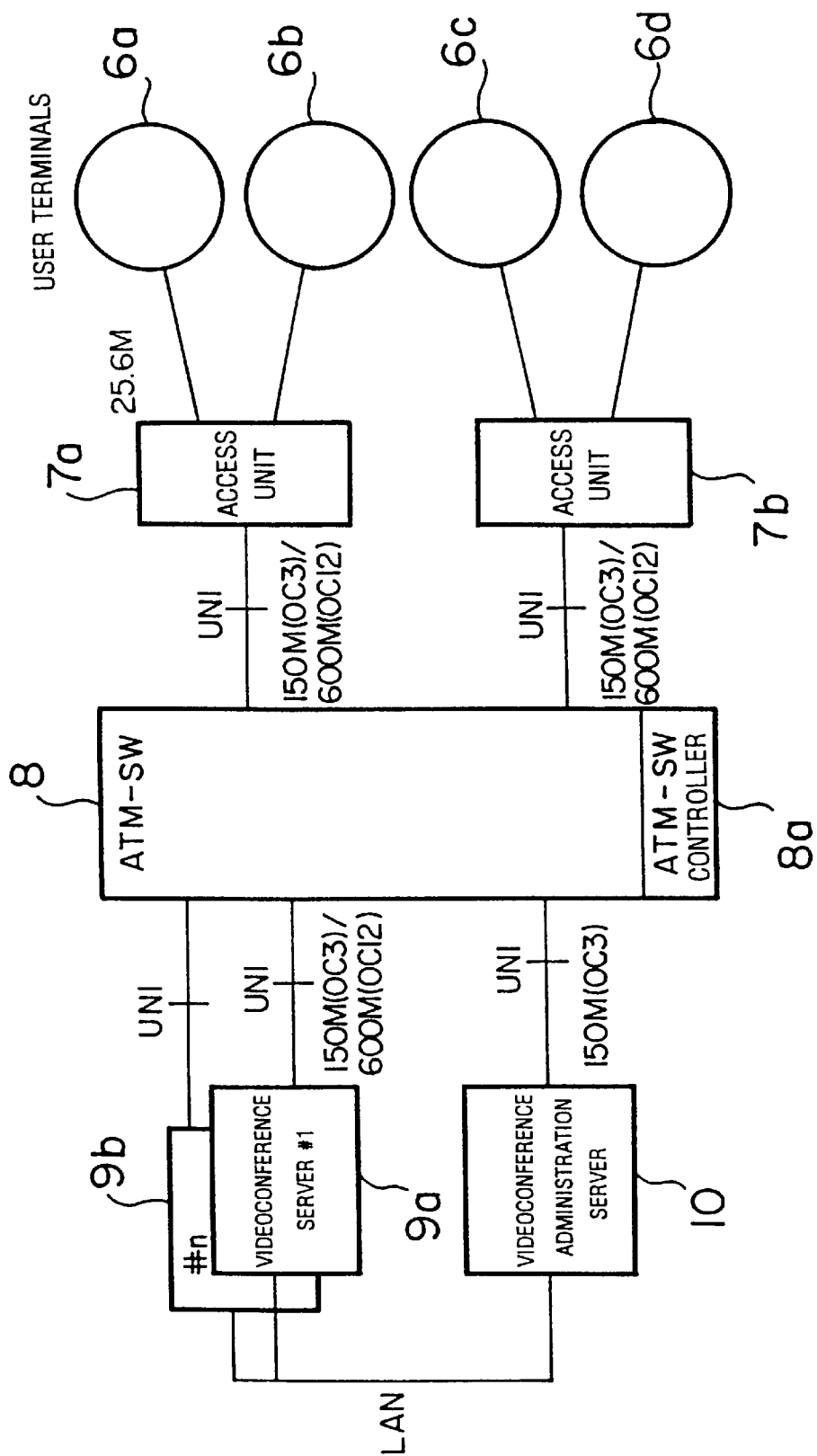
FIG. 2 is a diagram showing the structure of a videoconference system in which the present invention is embodied.

FIG. 2 is a diagram showing the structure of a videoconference system according to the present invention. In FIG. 2, user terminals 6a–6d are videoconference terminals equipped with a video camera, a video display unit, a microphone, speakers, coder/decoder for voice and video compression, an ATM interface and the like. A personal computer is used as the platform for such a user terminal. The user terminals 6a–6d communicate with videoconference servers 9a and 9b and a videoconference administration server 10 by exchanging ATM cells, as will be described in detail later with reference to FIG. 4.

The user terminals 6a–6d are connected to access unit 7a and 7b via twisted-pair communication channels with a transmission rate of 25.6 Mbps. The access unit 7a and 7b are further linked to an ATM switching system (ATM-SW) 8 via optical cable connections that provide a transmission rate of 150 Mbps or 600 Mbps. The access unit 7a and 7b are units designed to support multipoint access, thereby providing an optimal configuration of network media. The links between the access units 7a and 7b and the ATM switching system (ATM-SW) 8 conform to several standards as known as the User Network Interface (UNI). The ATM-SW 8 is a switch that routes the ATM cells toward their respective destinations. Although not shown in FIG. 2, the ATM network comprises more nodes having such ATM switching capabilities. In FIG. 2, an ATM-SW controller 8a is a part of the ATM-SW 8 to supervise its operation. It should be also noted that the ATM-SW 8 will support not only Permanent Virtual Connection (PVC) services but also Switched Virtual Connection (SVC) services.

The left half of FIG. 2 illustrates videoconference servers 9a and 9b linked to the ATM-SW 8 via 150 or 600 Mbps optical channels and a videoconference administration server 10 also linked to the ATM-SW 8 via a 150 Mbps optical channel. All the links between the ATM-SW 8 and the servers 9a, 9b, and 10 conform to the UNI interface standards. In addition to those ATM-based links, local area network (LAN) connections are available between the videoconference servers 9a and 9b and the videoconference administration server 10.

Each of the videoconference servers 9a and 9b will devote itself to a single videoconference, serving for multiple user terminals, or attendant parties, through the above-described ATM network including the ATM-SW 8. From the user terminals involved, the videoconference servers 9a and 9b receives video and audio signals encoded according to the Motion Picture Experts Group (MPEG) standards, as well as accepting other signals carrying various materials prepared for the videoconference. The videoconference servers 9a and 9b then apply a predetermined editing process to the received signal contents and distribute the resultant signals to the user terminals via the ATM-SW 8. The videoconference administration server 10 controls logical connections between a videoconference server in charge of a conference and user terminals involved in the conference.

The structural elements explained in FIG. 1 are implemented in this specific videoconference system of FIG. 2 as follows. The ATM network 1 in FIG. 1 corresponds to the ATM-SW 8 and the surrounding links shown in FIG. 2. The videoconference terminals 2a–2d shown in FIG. 1 are implemented as the user terminals 6a–6d in FIG. 2, and likewise, the videoconference servers 3a and 3b correspond to the videoconference servers 9a and 9b. The videoconference administration server 4 in FIG. 1 is the videoconference administration server 10 in FIG. 2.

Figure 3:
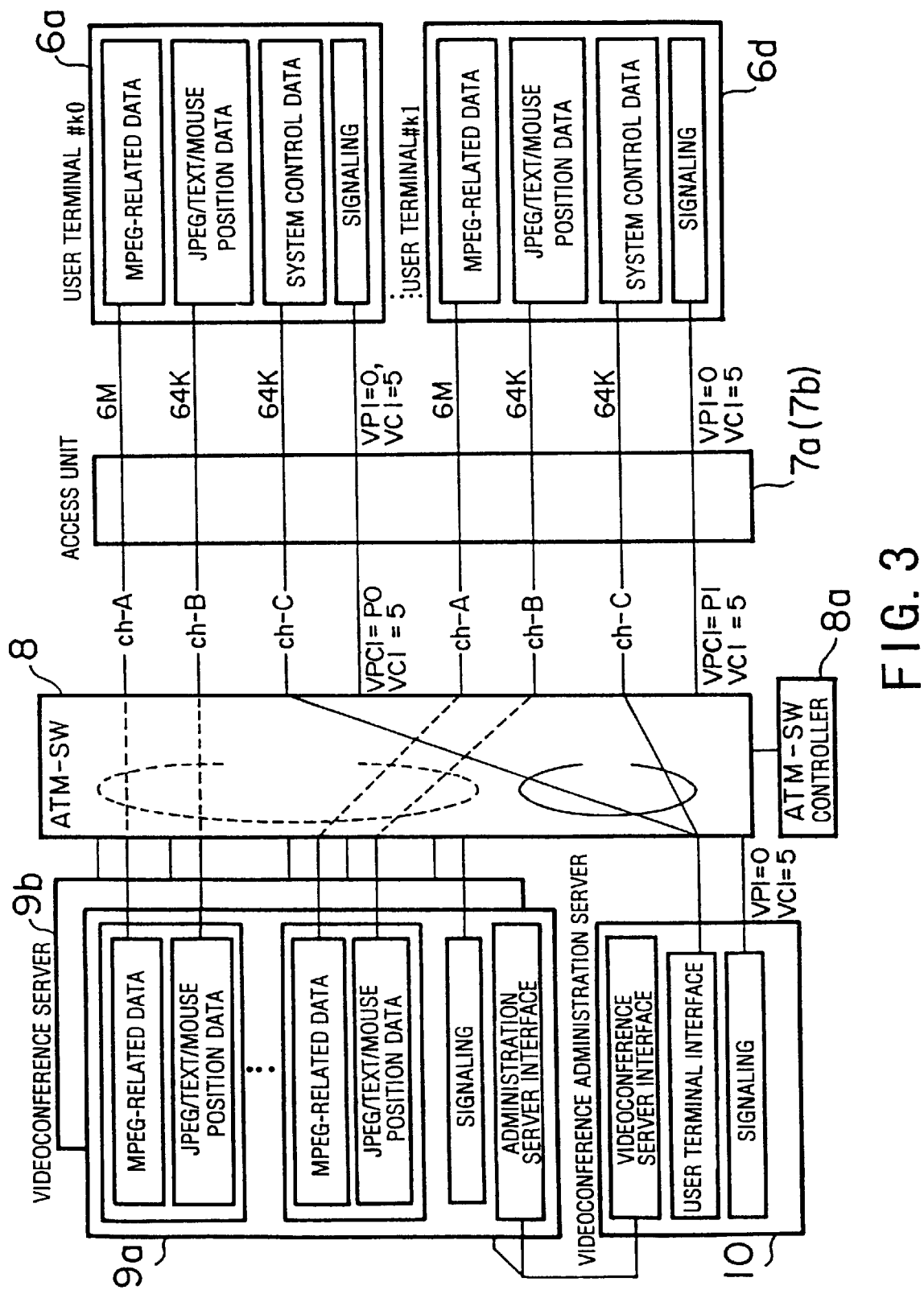
FIG. 3 is a diagram showing an ATM layer structure of the videoconference system embodying the present invention.

FIG. 3 shows an ATM layer structure of the videoconference system of the present embodiment of the invention. More specifically, FIG. 3 illustrates several connection paths, labeled as "ch-A," "ch-B," "ch-C" and the like, between the servers and terminals, which provide various services according to the ATM Forum standards. The connection paths ch-A connecting the user terminals 6a–6d to the videoconference server 9a are used to convey MPEG-coded voice and video signals, where the ATM Adaptation Layer (AAL) type 5 and Constant Bit Rate (CBR) services are supported. This connection path occupies the channel bandwidth of about 6 Mbps to transfer MPEG2 standard-based voice and video, while it only requires about 1.5 Mbps for MPEG1 standard video.

The connection paths ch-B, which connect the user terminals 6a–6d to the videoconference server 9a, will convey the signals for various materials used in a videoconference, where the AAL type 5 and Unspecified Bit Rate (UBR) services are provided. Since the traffic of those signals is bursty and not so time-critical, the transmission rate of about 64 kbps will serve enough. The above-described connection paths, ch-A and ch-B, are established as SVCs which temporarily connect the user terminals 6a–6d to the videoconference server 9a. Here, the signals related to conference materials include: (1) JPEG-compressed images which are generated by optically reading a document with an image scanner, (2) Text data entered through keyboards, and (3) Mouse position signals which indicate a particular point of a material image displayed on a screen of the video display unit as part of the user terminals 6a–6d.

The connection paths ch-C connect the user terminals 6a–6d to the videoconference administration server 10, where the AAL type 5 and UBR services are supported. They are used to exchange system control data so as to support reservations for videoconference and to manage the connections between user terminals and a videoconference server. The transmission rate of about 64 kbps is sufficient for this purpose. The connection paths ch-C are set up as SVCs originated from the user terminals 6a–6d or the videoconference administration server 10. Independent of the above-described three connection paths, the system will establish some dedicated paths for signaling purposes between the videoconference server 9a and 9b and videoconference administration server 10. Those additional control paths are identified by the virtual path and virtual channel identifiers, VPI=0 and VCI=5.

Figure 4:
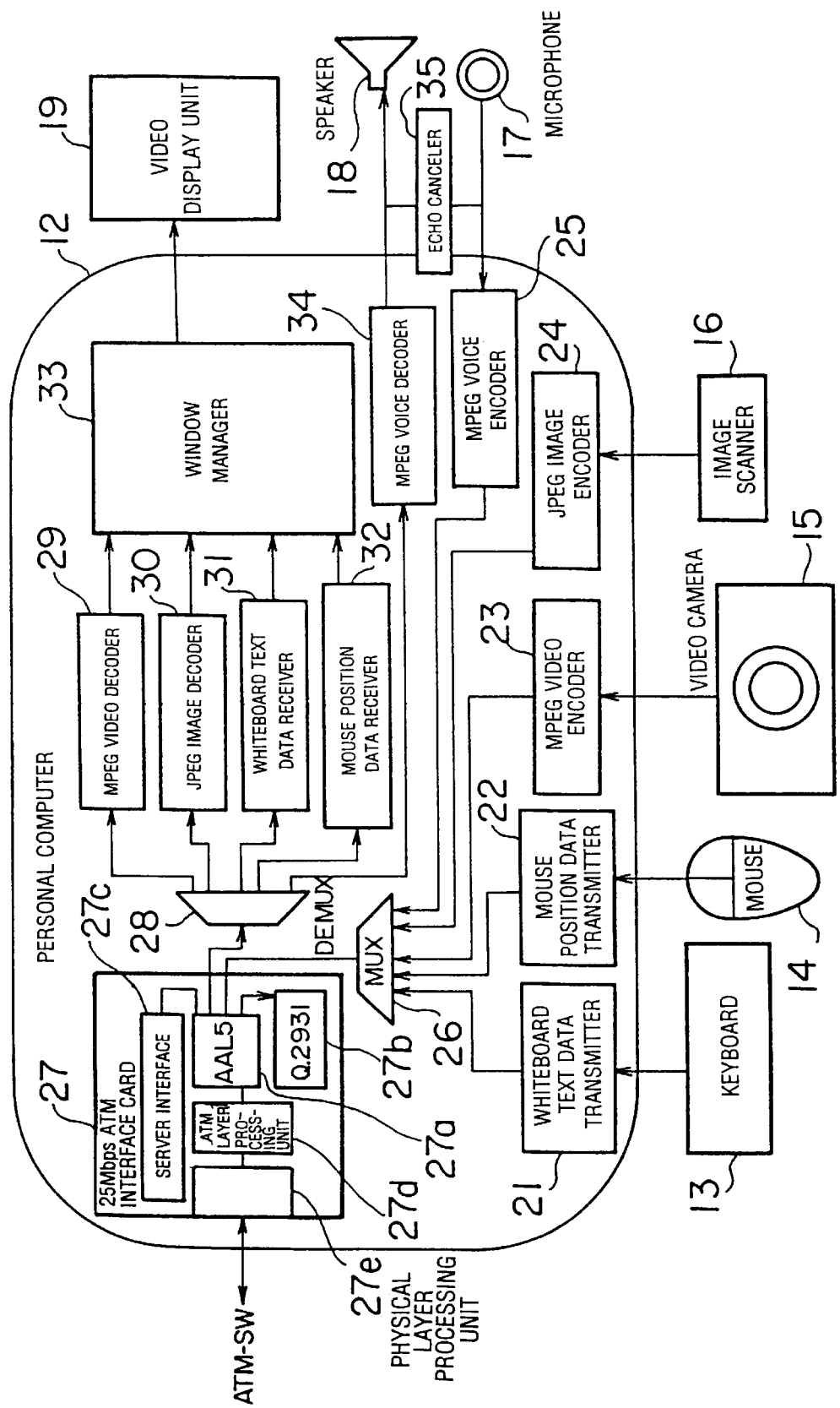
FIG. 4 is a block diagram showing the internal structure of a user terminal.

FIG. 4 is a block diagram showing the internal structure of the user terminals 6a–6d. Since the user terminals 6a–6d all have the same internal structure, FIG. 4 illustrates only one such unit.

A personal computer 12 is used as the main body of the user terminal, to which a variety of peripheral devices are connected. The peripheral devices include: a keyboard 13, a mouse 14, a video camera 15, an image scanner 16, a microphone 17, a speaker 18, and a video display unit 19. The personal computer 12 accepts text data entered through the keyboard 13 for use in the conference and sends them to a multiplexer (MUX) 26 via a whiteboard text data transmitter 21. The mouse 14 is used to point at a particular position of a document image shown on the screen of the video display unit 19. The movement of this mouse 14 is supplied to the multiplexer 26 as mouse position data produced by a mouse position data transmitter 22. The video camera 15 captures the video image of each conference participant, which data is applied to an MPEG video encoder 23 for a video compression coding based on the MPEG standards. This MPEG-coded video data is supplied to the multiplexer 26. The image scanner 16 is used to input the bit images of paper materials prepared for the conference. The captured bit images are compressed by a JPEG image encoder 24, and the JPEG-coded image data is sent to the multiplexer 26. The microphone 17 captures the speech of each participant, which speech data is compressed by an MPEG voice encoder 25 and supplied to the multiplexer 26. As such, the multiplexer 26 collects all the audio and video information captured by the peripheral devices and output them to an ATM interface card 27 in a multiplexed form.

The ATM interface card 27 is a processing device which provides the personal computer 12 with a 25 Mbps ATM interface with the SVC capabilities. The ATM interface card 27 comprises an AAL5 processing unit 27a, a Q.2931 processing unit 27b, a server interface 27c, an ATM layer processing unit 27d, and a physical layer processing unit 27e. ATM cells generated in this ATM interface card 27 are output to the ATM-SW 8.

The ATM interface card 27 also accepts incoming ATM cells from the ATM-SW 8. Data signals extracted from the ATM cells are supplied to a demultiplexer (DEMUX) 28, which demultiplexes them to obtain the original signals including: MPEG-coded video signal, JPEG-coded still image signal, text data signal, mouse position data signal, and MPEG-coded voice signal. The MPEG-coded video signal is then decoded by an MPEG video decoder 29 to reproduce the original motion pictures in which all the participant images are gathered in a single screen. The JPEG-coded image signal is applied to a JPEG image decoder 30 to reproduce the original image of documents sent from the user terminals. A whiteboard text data receiver 31 reproduces a text image from the text data signal received. Processing the received mouse position data signal, a mouse position data receiver 32 generates some symbol images to represent the original mouse positions sent from the user terminals. A window manager 33 manages the screen layout so that the above-described video and still images will be arranged appropriately in the same screen. See FIG. 5 for a typical screen displayed by the video display unit 19. The MPEG-coded voice signal is decoded by an MPEG voice decoder 34 to reproduce the participants' voices mixed into a single audio channel to drive a speaker 18. To avoid howling, an echo canceler 35 is disposed between the speaker 18 and microphone 17.

Today, a wide variety of PCI bus boards, including MPEG code and ATM interface capabilities, designed for the PC-AT (a trademark of International Business Machine Corporation) and its compatibles are commercially available. The above-described system integration can be easily realized by installing those boards into optional slots of the personal computer 12.

Figure 5:
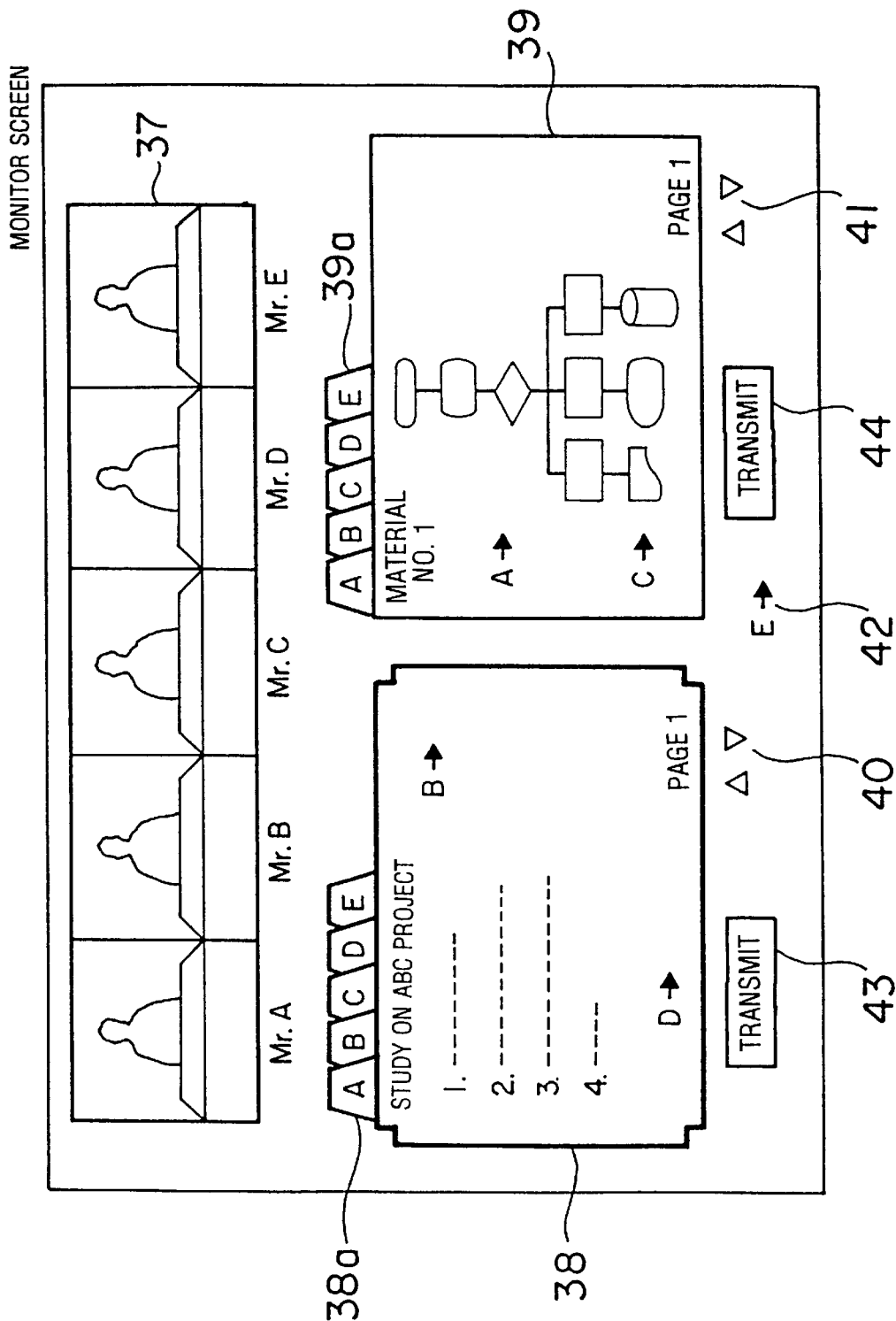
FIG. 5 is a diagram showing a typical screen displayed on a video display unit.

FIG. 5 is a diagram showing a typical screen displayed on the video display unit 19. It is assumed that the example videoconference involves five remote offices in total including the present user's location. The screen shows the motion images of the five participants (Mr. A to Mr. E) arranged in a top frame 37, which images are produced by combining and editing the individual video data collected from the individual user terminals. A bottom-left frame 38 shows a whiteboard, which displays text data sent from each user terminal. In a bottom-right frame 39, there is provided a material presentation board where the JPEG-coded still images can be seen. By operating his/her own terminal, each participant can locally select the desired contents to be displayed on the white board and/or material presentation board. More specifically, tabs 38a and 39a disposed on the top part of the frames 38 and 39 are properly labeled with the participant names or the location names to allow the users, or the participants, to easily identify the origins of the contents. FIG. 5 illustrates such labels, "A", "B", "C", "D" and "E", corresponding to the five different user terminals. When the user has selected a particular data content by clicking one of those tabs, the selected content will pop up on the board, and the selected tab will be highlighted by changing a color or by affixing a special symbol to clearly indicate the choice. In the case that the selected material consists of a plurality of pages, small triangle buttons 40 and 41 will appear below the frames 38 and 39, respectively. By clicking those buttons 40 and 41, the user can change the pages up and down. The screen further comprises some moving arrows 42 which are labeled with alphabetic characters, "A" to "E" (in FIG. 5, however, the reference numeral 42 is affixed only to the arrow "E"). Those arrows 42 are mouse position indicators generated from the mouse position data sent from the user terminals over the network. They represent the mouse movement that is occurred at the respective user terminals. "Transmit" buttons 43 and 44 located at the bottom of the screen are clicked by the user when he/she wishes to retransmit the whiteboard text or material image that was modified.

Figure 6:
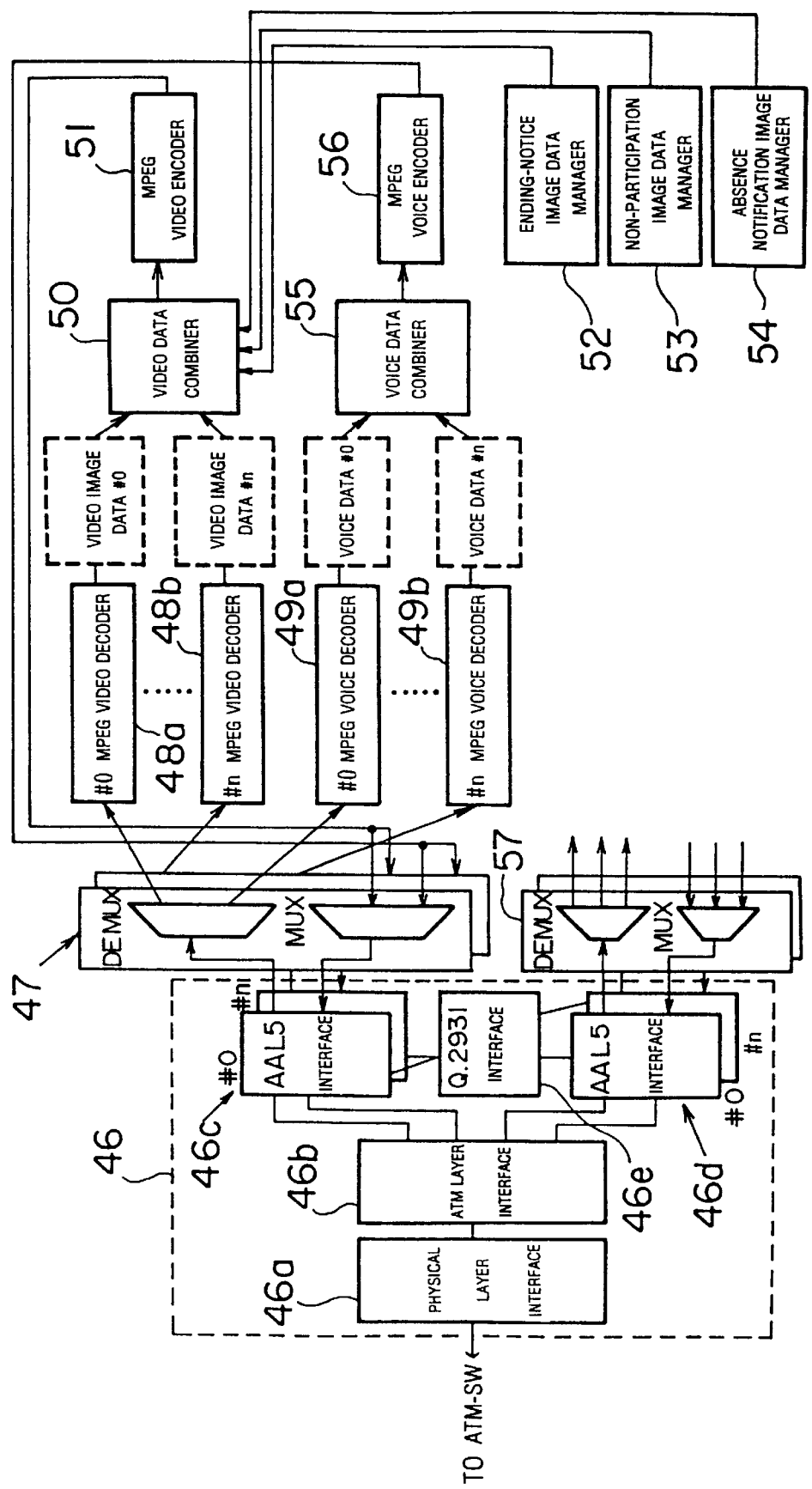
FIG. 6 is a block diagram showing a partial internal structure of a videoconference server.
Figure 7:
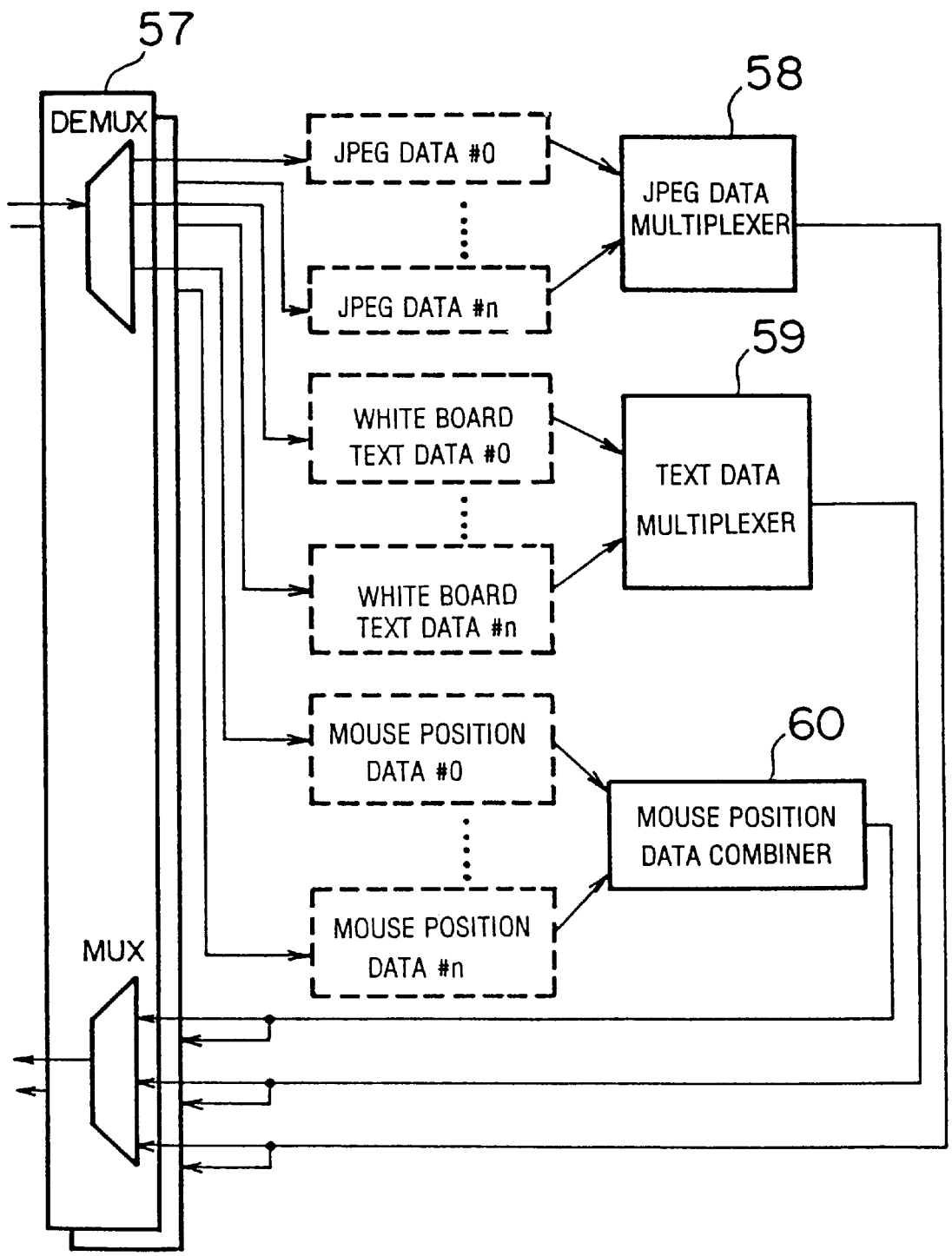
FIG. 7 is a block diagram showing the remaining part of the internal structure of the videoconference server, excluding the part shown in FIG. 6.

The internal structure of the videoconference servers 9a and 9b is depicted in two parts, one part in FIG. 6 and the rest in FIG. 7. Since the videoconference servers 9a and 9b share the same internal structure, FIGS. 6 and 7 illustrates only one unit.

Referring to FIG. 6, the link to the ATM-SW 8 is provided by an ATM interface unit 46, which comprises a physical layer interface 46a, an ATM layer interface 46b, AAL5 interface units 46c and 46d, and a Q.2931 interface unit 46e. Two sets of AAL5 interface units 46c and 46d each consists of as many interfaces as the number of user terminals that can join a single videoconference. Those constituent units numbered from #O to #n are assigned to the individual user terminals. More specifically, the ATM cells transmitted over the two connection paths, ch-A and ch-B, will have unique VPI/VCI numbers, which are different for each user terminal and for each path. The AAL5 interfaces 46c process the MPEG-coded voice and video signals, while the AAL5 interfaces 46d handle the JPEG-coded image signal, text data signal, and mouse position data sigdata signal. The Q.2931 interface 46e performs various signaling procedures including the SVC support.

With their parallel structure, multiplexer/demultiplexers 47 can handle the MPEG-coded voice and video signals to/from many user terminals in a concurrent manner. Separately for each user terminal, the multiplexer portion (MUX) converts the signal format so that the video and voice signals will be carried on a single communications channel. On the other hand, the demultiplexer portion (DEMUX) splits the multiplexed voice/video signal into two separate signals. FIG. 6 shows that the MPEG-coded video signal and MPEG-coded voice signal sent from the user terminal #O are demultiplexed and sent to an MPEG video decoder 48a and an MPEG voice decoder 49a, respectively, to reproduce the original video and voice signals. Similarly, the MPEG-coded video signal and MPEG-coded voice signal sent from the user terminal #n are separated and sent to an MPEG video decoder 48b and an MPEG voice decoder 49b, respectively, to reproduce the original video and voice signals.

The video image data #O to #n reproduced by the MPEG video decoders 48a–48b are then applied to a video data combiner 50. From each data, the video data combiner 50 cuts out a portrait picture with an adequate size which includes at least the face of a participant. Here, the video frame is partitioned into macroblocks each consisting of 16×16 pixels, and the portrait picture extraction is actually restricted by the boundaries of this partition. The video data combiner 50 arranges the extracted pictures adequately on the same screen, thereby creating a combined video signal. A MPEG video encoder 51 produces an MPEG-coded video signal by encoding the combined video signal and sends it to the multiplexer/demultiplexer 47. Besides combining the extracted portrait pictures, the video data combiner 50 will overlay some additional images sent from an ending-notice image data manager 52, non-participation image data manager 53, and absence notification image data manager 54. The ending-notice image data manager 52 generates an ending-notice image which notifies all participants that the videoconference is coming to an end. The non-participation image data manager 53 generates a non-participation image which indicates that one of the expected participants will not join the scheduled videoconference. The absence notification image data manager 54 generates an absence notification image which indicates that the system continues calling one of the user terminals, when it does not respond to the call or returns a busy status signal in response to the call.

The voice data #O to #n reproduced by the MPEG voice decoders 49a–49b are then subjected to a voice data combiner 55 to produce a mixed voice signal. A MPEG voice encoder 56 then generates an MPEG-coded voice signal by encoding the mixed voice signal and sends it to the multiplexer/demultiplexer 47.

The multiplexer/demultiplexers 47 multiplex the received video and voice signals and sends the multiplexed signal to the ATM interface unit 46. The ATM interface unit 46 creates ATM cells addressed to the user terminals participating in the videoconference and delivers them via the ATM-SW 8.

Referring next to FIG. 7, the multiplexer/demultiplexer 57 and other remaining functions will be explained below. With their parallel structure, multiplexer/demultiplexers 57 can perform multiplexing and demultiplexing of the JPEG-coded image signal, text data signal, and mouse position data signal to/from all the participant user terminals at a time. The demultiplexed JPEG-coded image signals (JPEG data) #O–#n are concentrated at a JPEG data multiplexer 58 to embed some unique numbers thereto to identify the source user terminals where the JPEG data were originated. The signals processed in that way are multiplexed again and supplied to the multiplexer/demultiplexer 57 on demand, or at certain predetermined intervals that would not affect other communication activities.

Similar to the JPEG data, the demultiplexed text data signal (whiteboard text data) #O–#n are concentrated at a text data multiplexer 59 to embed some unique numbers identifying the source user terminals where the data were originated. The text data multiplexer 59 multiplexes those processed text data signals again and supplies them to the multiplexer/demultiplexer 57 when necessary, or at certain intervals that would not affect other communication activities.

Furthermore, the mouse position data signals (mouse position data #O–#n) demultiplexed by the multiplexer/demultiplexer 57 are collected by a mouse position data combiner 60 to embed the unique numbers identifying the source user terminals where the data were originated. The processed signals are multiplexed again and supplied to the multiplexer/demultiplexer 57 when necessary, or at certain intervals that would not affect other communication activities.

The multiplexer/demultiplexers 57 multiplex the received signals separately for each user terminal and sends the multiplexed signals to the ATM interface unit 46. The ATM interface unit 46 creates ATM cells addressed to the user terminals participating in the videoconference and delivers them via the ATM-SW 8.

Figure 8:
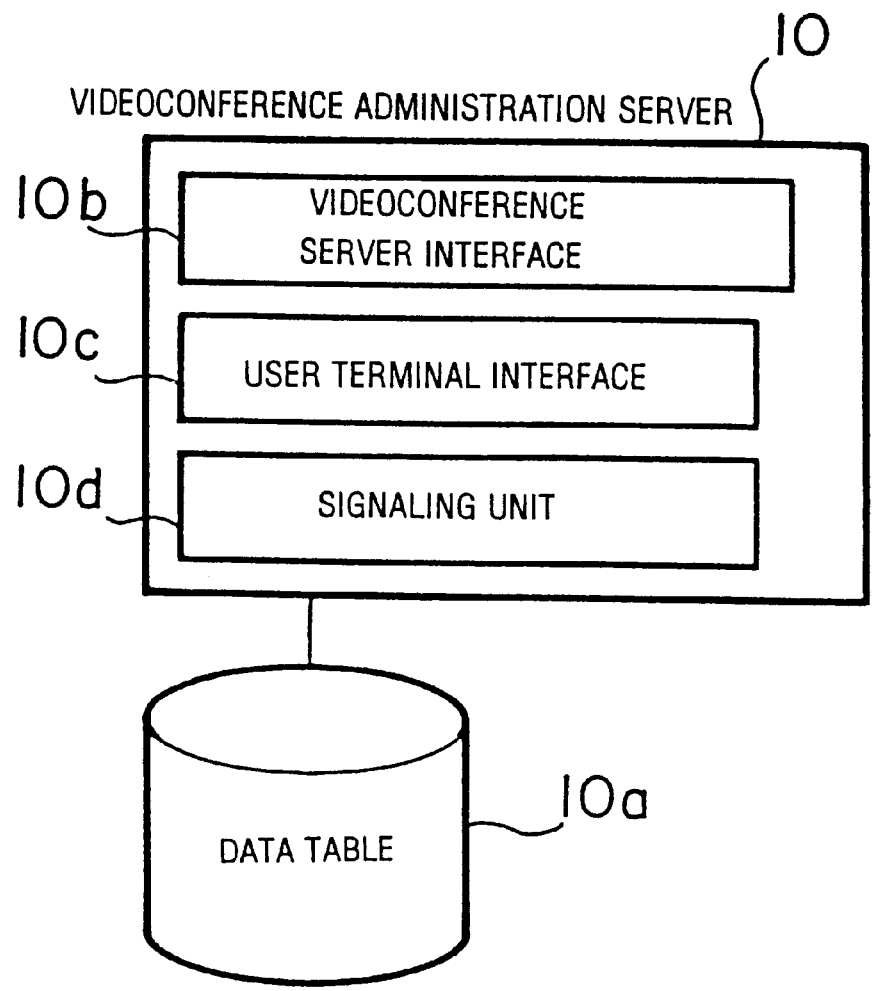
FIG. 8 is a block diagram showing the internal structure of a videoconference administration server.

FIG. 8 is a block diagram showing the internal structure of a videoconference administration server 10. The videoconference administration server 10 comprises, a data table 10a, a videoconference server interface 10b, a user terminal interface 10c, and a signaling unit 10d. The data table 10a stores information used in the schedule management including a reservation control system for the videoconference. Such administrative data is prepared separately for each user terminal. Besides being connected with the videoconference servers via a local area network, the videoconference server interface 10b is linked to all the user terminals via the ATM-SW 8. The signaling unit 10d is connected to the Q.2931 processing unit 27b disposed in all the user terminals, via the dedicated channel (VPI=0, VCI=5) for signaling in the ATM network.

FIG. 9 shows the contents of the data table 10a. The following will explain the definition of each column of the data table 10a. The first column titled "server number" stores the identification numbers of the videoconference servers, and the second column "server ATM-address" shows their ATM network addresses. The third column titled "server usage status" indicates whether each videoconference server is in use or vacant. The fourth column "maximum simultaneous channels" means the maximum number of channels which are available for connection of user terminals. The fifth column named "reservation" includes the start times and the end times of planned conferences that will use a specific videoconference server. The sixth column "reserved channels" indicates the number of user terminals that are scheduled to take part in the planned videoconference, and the seventh column "reserved user terminal ATM-address" lists all the ATM addresses of those participant user terminals. The last column titled "connection status" indicates the present activity status of each user terminal.

With the above-described structural arrangement, the videoconference system of the present invention will operate as illustrated in FIGS. 10–16.

Figure 10:
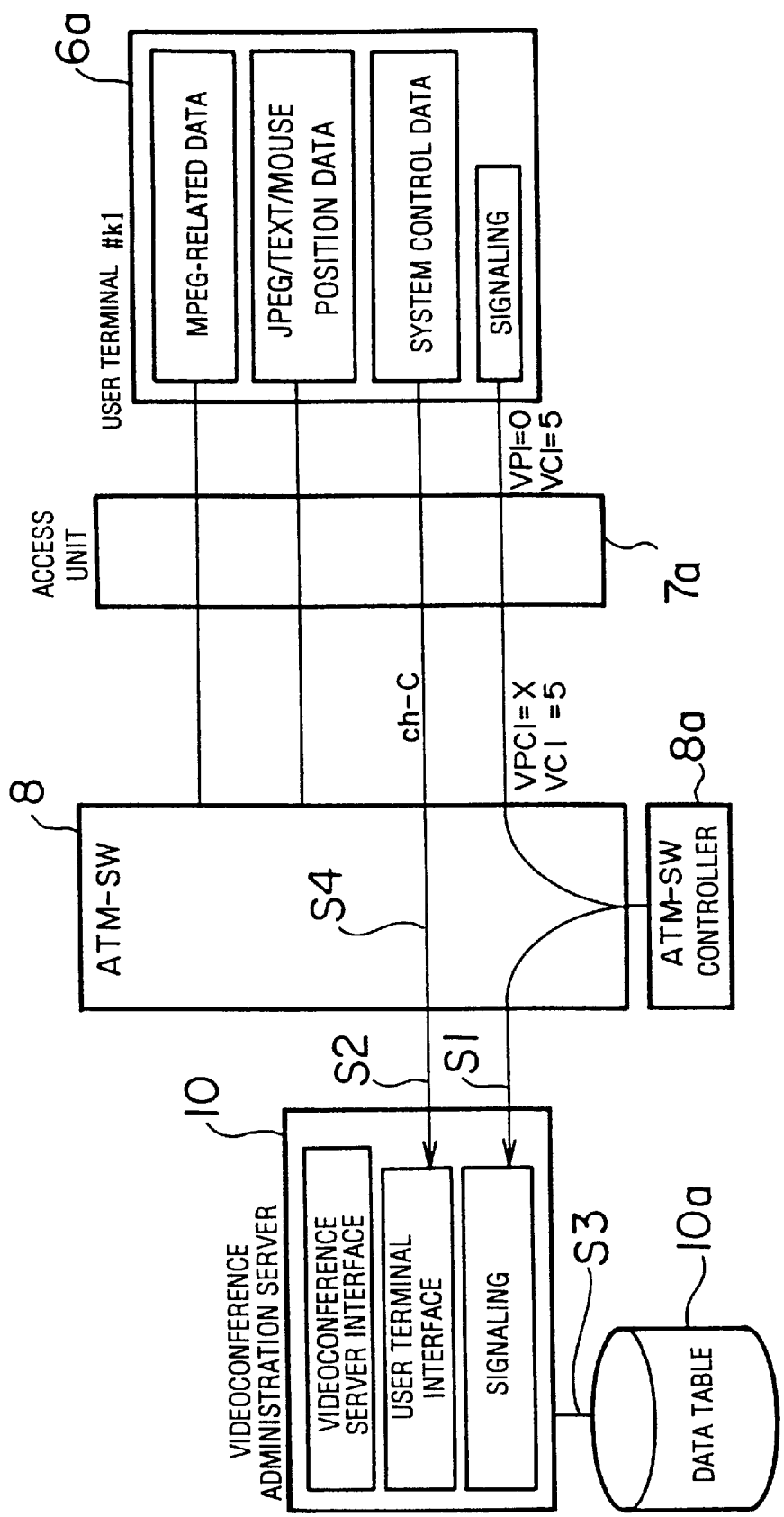
FIG. 10 is a sequence diagram showing a reservation procedure of a videoconference.

FIG. 10 is a sequence diagram showing a procedure to make a reservation for a videoconference. The following will explain the detailed operations according to the sequence of the step numbers.

[S1] A user terminal 6a, for example, is attempting to make a reservation for a videoconference. For the first step, the user terminal 6a makes access to the videoconference administration server 10, initiating an SVC call via the signaling channel. This operation sets up a ch-C connection path.

[S2] Using this ch-C, the user terminal 6a notifies the videoconference administration server 10 of the start time and end time of the planned conference and the ATM addresses of participant user terminals.

[S3] The videoconference administration server 10 searches the data table 10a for a vacant videoconference server. When a vacant server is found, it will fill in the columns of the data table 10a which are corresponding to the found server, thereby making a reservation.

[S4] The ch-C connection path between the user terminal 6a and videoconference administration server 10 is disconnected when the reservation is finished.

Figure 11:
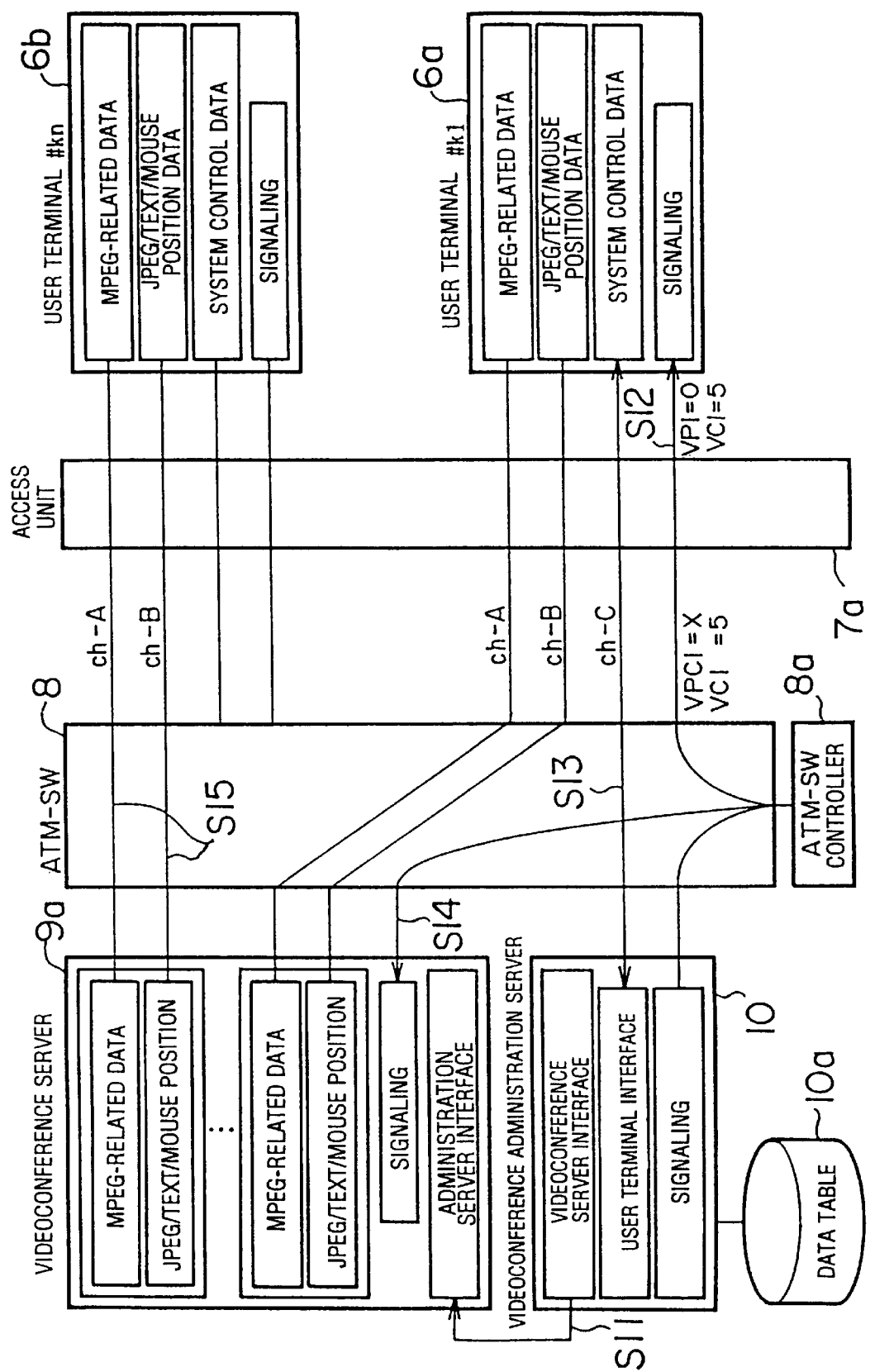
FIG. 11 is a sequence diagram showing a path establishment procedure which is performed by a videoconference server and terminals to set up a path between them.

FIG. 11 is a sequence diagram showing a path establishment procedure which is performed before opening a videoconference to set up a path between a videoconference server and participant user terminals. The following will explain the operations performed in this procedure, in accordance with the sequence numbers shown in FIG. 11.

[S11] The videoconference administration server 10 is watching the data table 10a to grasp the timing just before the opening of the scheduled conference. When the time has come, the videoconference administration server 10 notifies the reserved videoconference server, say 9a, of the information regarding the reserved user terminals registered in the data table 10a.

[S12] The videoconference administration server 10 makes access to the participant user terminals, using the SVC services via the signaling channel. If the called user terminal, say 6a, responded to the access within a predetermined time period, a ch-C connection path will be successfully established between the videoconference administration server 10 and the user terminal 6a.

[S13] Through this ch-C, the videoconference administration server 10 notifies the user terminal 6a of the opening in the scheduled videoconference. If the user terminal 6a accepts the participation request from the videoconference administration server 10, the videoconference administration server 10 will provide the user terminal 6a with necessary information such as the ATM address to reach the relevant videoconference server, the transmission rate to be used, and the required quality of service (QoS).

[S14] The user terminal 6a makes access to the videoconference server 9a, using the SVC services via the signaling channel. This operation will set up two connection paths ch-A and ch-B between the user terminal 6a and videoconference server 9a. After confirming the path establishment of ch-A and ch-B, the videoconference administration server 10 disconnects the existing connection path ch-C between itself and the user terminal 6a.

[S15] The same sequence steps S12 to S14 are repeated so that another participant user terminal, say 6b, will set up the connection paths ch-A and ch-B to the videoconference server 9a.

Figure 12:
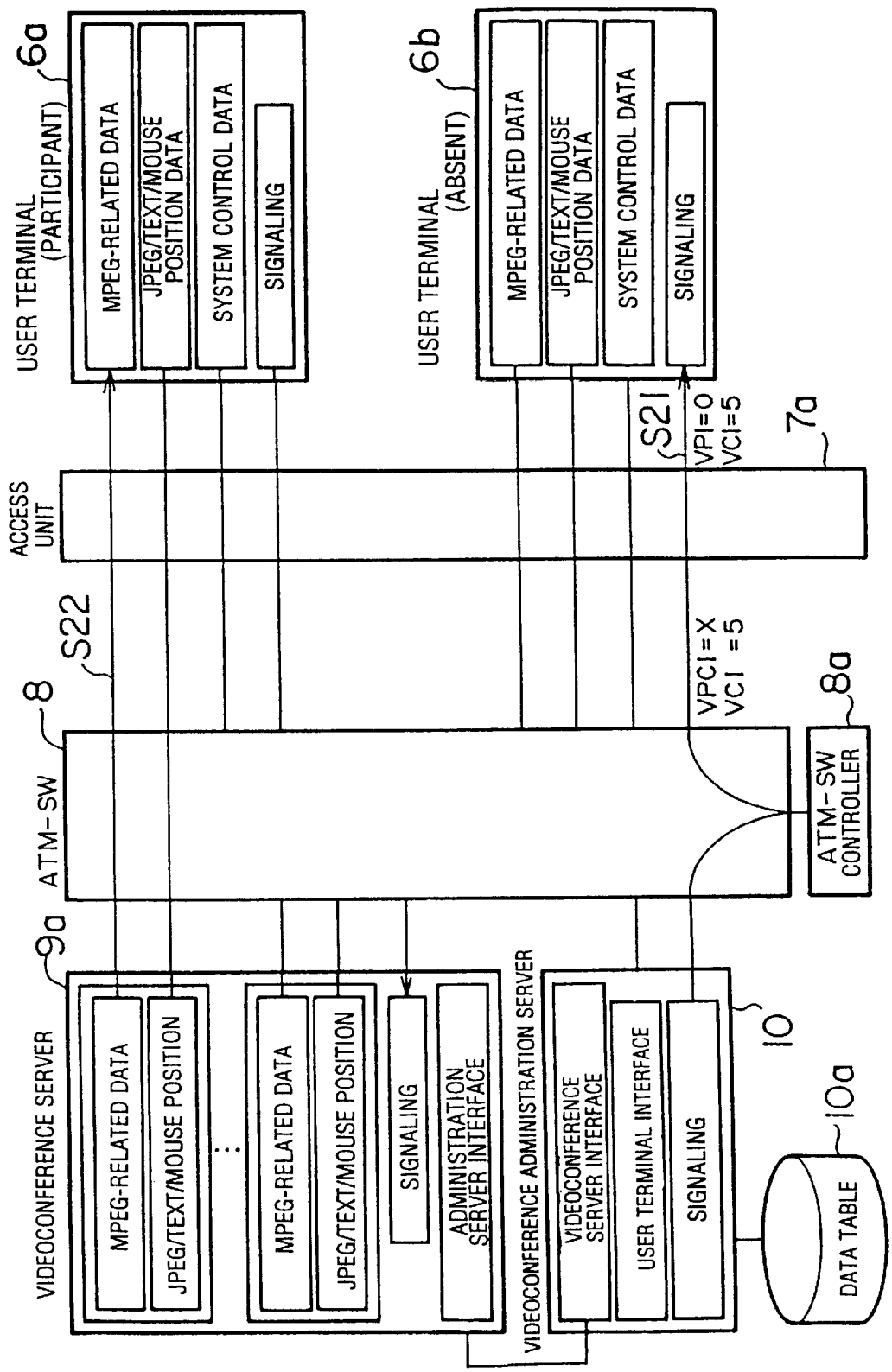
FIG. 12 is a sequence diagram showing a procedure that is executed when the user terminal returns silence or a busy signal in response to an access from the videoconference administration server in the path establishment procedure.

FIG. 12 is a sequence diagram showing a procedure that is executed when a user terminal returns silence or a busy signal in response to an access request from the videoconference administration server 10 in the path establishment procedure. The following will explain the operations performed in this procedure, in accordance with the sequence numbers shown in FIG. 12.

[S21] As in the above-described sequence S12, the videoconference administration server 10 makes access to a participant user terminal, say 6b, using the SVC services via the signaling channel. If the user terminal did not answer within a certain time period or returned a busy status signal in response to the access, the video-conference administration server 10 will repeat the same access after a predetermined interval. The videoconference administration server 10 attempts this access repeatedly as long as the videoconference is continued.

[S22] It is assumed here that the connection paths ch-A and ch-B have been successfully established between another participant user terminal, say 6a, and the videoconference server 9a, and thus the conference is opened as scheduled. In such a situation, the absence notification image data manager 54 in the videoconference server 9a outputs an absence notification image to the video data combiner 50. This image data is then delivered to the user terminal 6a, allowing the participant to recognize the absence or busy status of the user terminal 6b.

Figure 13:
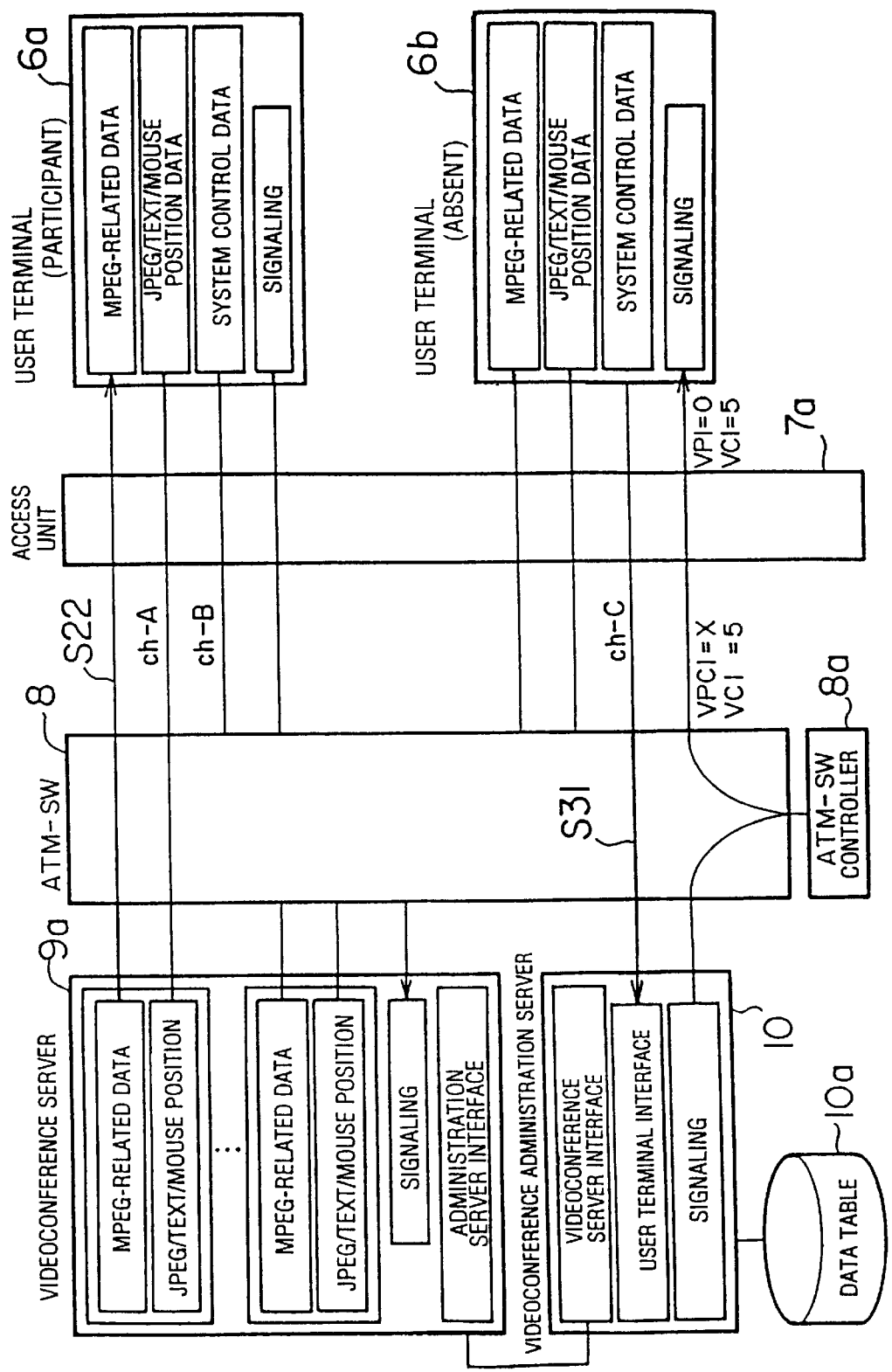
FIG. 13 is a sequence diagram showing a procedure that is executed when the user terminal declared non-participation to the conference in response to an access from the videoconference administration server in the path establishment procedure.

FIG. 13 is a sequence diagram showing a procedure that is executed when the user terminal declared non-participation to the conference in response to the access from the videoconference administration server 10 in the path establishment procedure. The following will explain the operations performed in this procedure, in accordance with the sequence numbers shown in FIG. 13.

[ES31] As in the sequence S13, the videoconference administration server 10 notifies a participant user terminal, say 6b, of the opening of the scheduled videoconference via the established connection path ch-C. It is assumed that the user terminal 6b replied to the videoconference administration server 10 that it would not participate the upcoming videoconference.

[S32] On the other hand, the connection paths chA and ch-B have been successfully established between another participant user terminal, say 6a, and the videoconference server 9a, and thus the conference has started as previously scheduled. In such a situation, the non-participation image data manager 53 in the video-conference server 9a outputs a non-participation indicator image to the video data combiner 50. This non-participation indicator image is delivered to the user terminal 6a via the connection path ch-A to allow the present participants to recognize the non-participation of the user terminal 6b.

Figure 14:
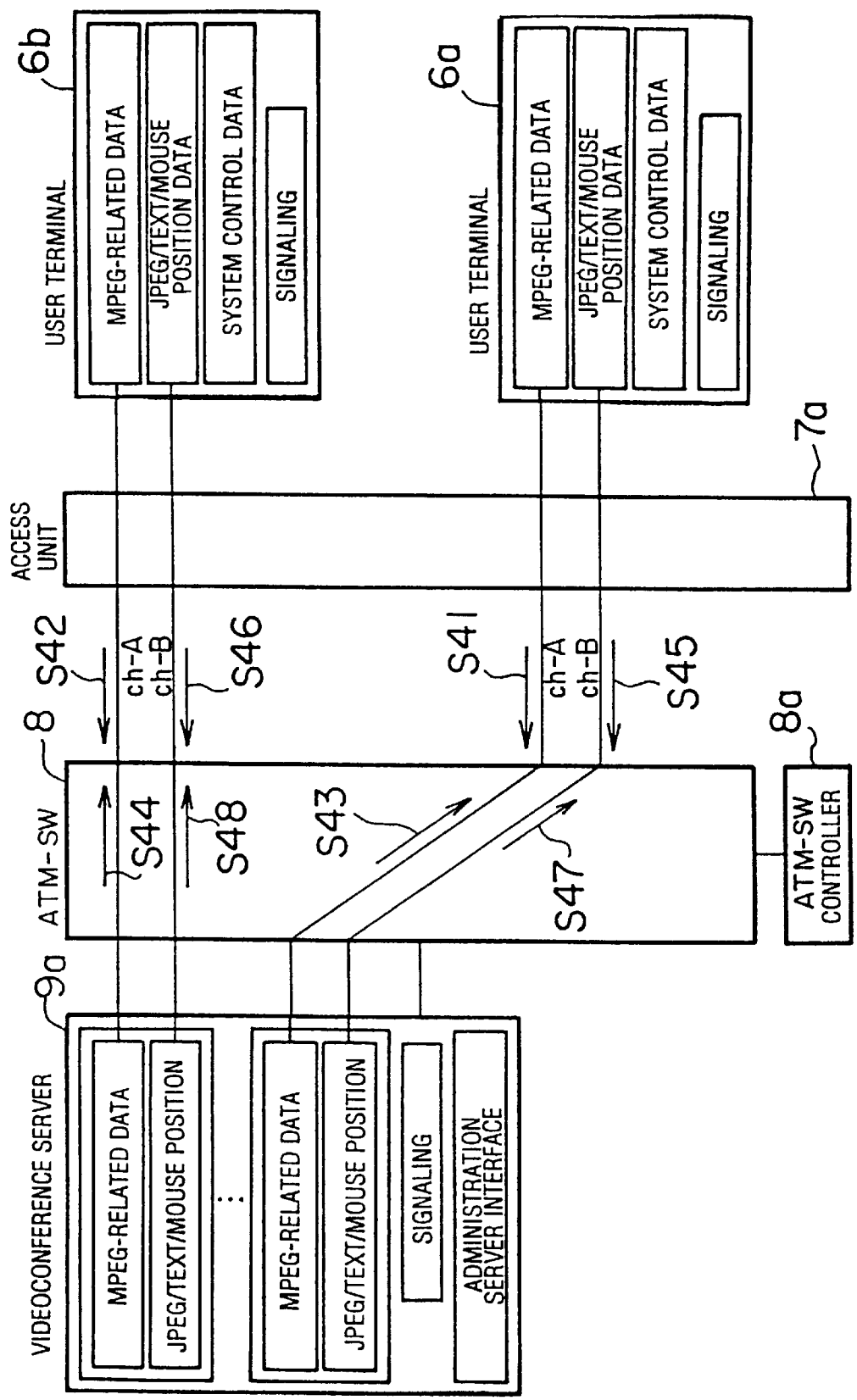
FIG. 14 is a sequence diagram showing a procedure of information transmission and reception which is performed by a videoconference server and user terminals during a videoconference.

FIG. 14 is a sequence diagram showing a procedure of information transmission and reception which is performed by a videoconference server and user terminals while a videoconference is in session. The following will explain the operations performed in this procedure, in accordance with the sequence numbers shown in FIG. 14.

[S41] Using the MPEG video encoder 23, the user terminal 6a connected to the videoconference server 9a encodes the video data captured with the video camera 15 and sends the compressed data to the videoconference server 9a through the connection path ch-A. Further, the user terminal 6a encodes the voice signal captured with the microphone 17, using the MPEG voice encoder 25. The compressed voice signal is then sent to the videoconference server 9a through the connection path ch-A.

[S42] Similar to the user terminal 6a, the user terminal 6b performs an MPEG coding of the captured voice and video signals and sends them to the videoconference server 9a through the connection path ch-A.

[S43] Upon reception of the video data sent from the user terminals 6a and 6b, the videoconference server 9a decodes them with the MPEG video decoders 48a and 48b and subjects the decoded video signals to the video data combiner 50. The video data combiner 50 rearranges them so that both of the decoded data will fit in a single video frame. The resultant video signal is encoded by the MPEG video encoder 51 and sent back to the user terminal 6a through the connection path ch-A.

Concurrently with the above video data processing, the videoconference server 9a performs decompression of voice signals sent from the user terminal 6a and 6b, using the MPEG voice decoder 49a and 49b. The decoded voice signals are mixed by the voice data combiner 55. Further, the MPEG voice encoder 56 compresses the mixed voice signal and delivers it to the user terminal 6a through the connection path ch-A.

In the user terminal 6a, the MPEG video decoder 29 and MPEG voice decoder 34 decode the MPEG-coded video signal and voice signal, respectively. The decoded video signal is then output to the video display unit 19, while the decoded voice signal is output to the speaker 18. As such, the user terminal 6a receives the video image that originates from itself. Monitoring the video image on the screen of the video display unit 19, the user will adjust the video transmission signal so that the displayed image will have a sufficient quality.

[S44] The videoconference server 9a also sends the same video and voice signals as explained in S43 to the user terminal 6b via the connection path ch-A. That is, the rearranged video and voice signals are distributed to all the participant user terminals. The user terminal 6b outputs the rearranged video and voice signals through its video display unit 19 and speaker 18 in the same way as the user terminal 6a does.

[S45] Using the JPEG image encoder 24, the user terminal 6a connected to the videoconference server 9a encodes the image data captured by the image scanner 16 and sends the compressed data to the videoconference server 9a through the connection path ch-B. Further, the user terminal 6a sends text data entered through the keyboard 13 to the videoconference server 9a via the same connection path ch-B. Still further, the user terminal 6a delivers mouse position data obtained from the mouse 14 to the videoconference server 9a via the connection path ch-B.

[S46] In the same manner, the user terminal 6b sends material images captured by the image scanner 16, material text data entered through the keyboard 13, and mouse position data obtained from the mouse 14 to the videoconference server 9a via the connection path ch-B.

[S47 and S48] Each time the material image, material text, and mouse position data arrive from the user terminals 6a or 6b, the videoconference server 9a affixes the user terminal identification code to those data and distributes them to all the participant user terminals.

Optionally, the videoconference server 9a may keep those image and text data sent to the user terminals. When another user terminal joined the conference in the middle of the session, the videoconference server 9a will be able to immediately transmit those stored data to the new member. The videoconference server 9a can also be configured in such a way that the collected material image data and text data will be delivered to all the participants at certain intervals that would not affect other communications activities.

Each user terminal accumulates the image and text data sent from the videoconference server. Through a simple operation, the terminal operator can browse the stored material as desired. More specifically, as illustrated in FIG. 5, the materials have tabs 38a and 39a with unique labels "A" to "E" to show the participants' names. The terminal operator can select a particular data content by clicking one of those tabs. The selected content will immediately appear on the screen of the video display unit 19. All the mouse position data collected from the user terminals are graphically represented on the same screen.

Figure 15:
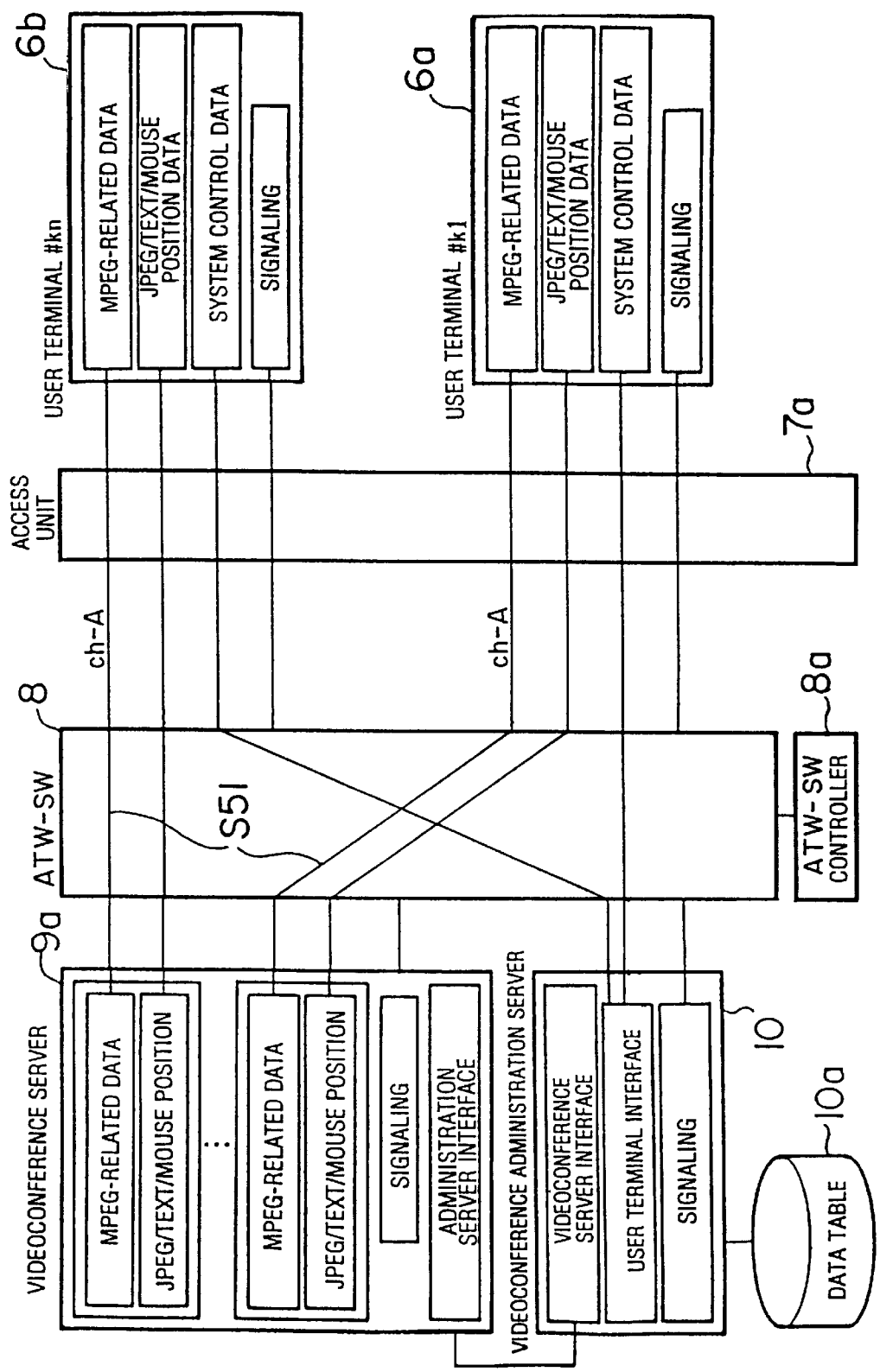
FIG. 15 is a sequence diagram showing a procedure that is executed when a videoconference is about to end as scheduled.

FIG. 15 is a sequence diagram showing a procedure that is executed when the conference is about to end. The following description will proceed according to the sequence numbers shown in FIG. 15.

[S51] The videoconference server 9a detects an appropriate timing to notify the participants, in advance, of the end of the conference. This timing is set to a short time (e.g., five or ten minutes) before the scheduled closing time. The ending-notice image data manager 52 in the videoconference server 9a generates an ending-notice image to the video data combiner 50, which is delivered to all participants via the connection paths ch-A. Knowing that the conference is coming to an end, the participants will try to conclude the discussion.

Figure 16:
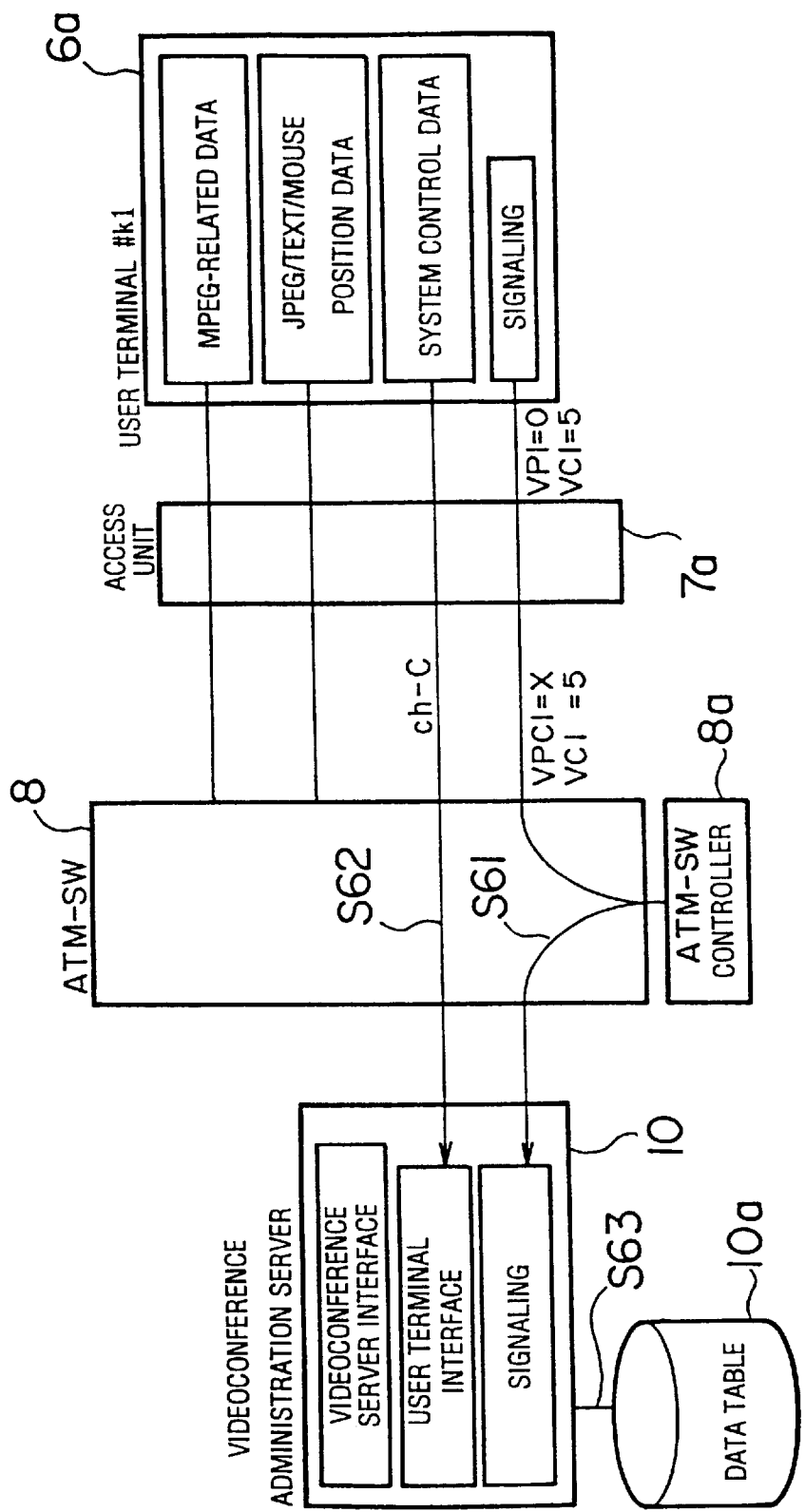
FIG. 16 is a sequence diagram showing a procedure of canceling a reservation that has been made for a videoconference.

FIG. 16 is a sequence diagram showing a procedure of canceling a reservation for a videoconference. The following description will proceed according to the sequence numbers shown in FIG. 16.

[S61] Cancellation of a reserved videoconference can only be performed by the same user terminal that made the reservation. Assume here that the user terminal 6a is such a terminal. The user terminal 6a first makes access to the videoconference administration server 10, using the SVC services via the signaling channel. This operation sets up a ch-C connection path.

[S62] Via the same ch-C, the user terminal 6a then transmits a cancellation request message to the videoconference administration server 10, along with the ATM address of its own, the planned start time, and other information pertaining to the reserved conference.

[S63] The videoconference administration server 10 finds that the claimed reservation is registered in the data table 10a, and then it deletes the relevant entries in each column.

The videoconference system of the present invention operates in the above-described way. Although the above description and the accompanying drawings illustrated a system with two videoconference servers and four user terminals, it is not desired to limit the invention to the exact number of servers or terminals illustrated. The present invention can also be applied to larger systems involving many servers and terminals. The signal transmission rates exemplified in the embodiment will not limit the scope of the present invention.

The above discussion will be summarized as follows. According to the present invention, a plurality of videoconference terminals and videoconference servers are interconnected via an ATM network. The ATM cells will carry various signals including video signals, voice signals, material data signals, and rearranged signals that derive from those original signals.

The ATM networks can handle a variety of different information traffic in an integrated way, using statistic multiplexing techniques adaptive to the nature of each traffic, thus making it possible to use the network bandwidth quite efficiently. It is therefore possible to transmit a large amount of video data at a relatively low cost, and concurrently with this, various kinds of materials can be transferred through separate communications channels. The videoconference terminals will provide the participants in a conference with more detailed visual information including their facial expressions. The videoconference servers receives the motion images of all participants from the videoconference terminals and rearranges them so that they will fit into the same screen. This well-arranged screen image is then delivered to the terminals, which provides the participants with a feeling of taking part in the conference. With the material transfer facility according to the present invention, the participants can show their materials to the remote screens while separately maintaining the video connection. This feature realizes a more realistic videoconference environment, where the participants will feel as if all the members gathered together under one roof.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multipoint videoconference system constructed on an ATM network, comprising:
   first communications channels established as part of the ATM network;
   second communications channels established as part of the ATM network, having transmission rates lower than those of said first communication channels;
   a plurality of videoconference terminals each of which comprises:
      transmission means for transmitting video and voice signals over said first communications channels, and material data signals over said second communications channels, wherein the material data signals convey still images, text data, and mouse position data which are produced locally at each said videoconference terminal,
      reception means for receiving rearranged video and voice signals sent over said first communications channels, and receiving collected material data signals sent over said second communications channels, and
      display means for displaying images produced from the collected material data signals received by said reception means on a monitor screen, together with motion images produced from the rearranged video and voice signals received by said reception means;
   a videoconference server which rearranges the video and voice signals, and the material data signals received from said plurality of videoconference terminals over said first and second communications channels, and sends the rearranged video and voice signals and the collected material data signals back to the plurality of videoconference terminals via said first and second communications channels, respectively; and
   a videoconference administration server which controls network connections between said videoconference server and said plurality of videoconference terminals.

2. The multipoint videoconference system according to claim 1, comprising a plurality of videoconference servers, wherein
   said videoconference administration server comprises
      (a) reservation means, responsive to a reservation request sent from one of said plurality of videoconference terminals via the ATM network, for finding a particular videoconference server from among said plurality of videoconference servers and making a reservation for a videoconference using said particular videoconference server that is found available, and
      (b) connection information transmission means, activated at a scheduled start time for the videoconference reserved by said reservation means, for transmitting connection information to participant videoconference terminals via the ATM network, wherein said connection information is information necessary for the participant videoconference terminals to connect to said particular videoconference server, and
   said participant videoconference terminals make a connection with said particular videoconference server based upon said connection information received from said connection information transmission means, and after the connection is established, said participant videoconference terminals start communication with said particular videoconference server via the ATM network to transfer the video signals, the voice signals, the material data signals, and the rearranged signals.

3. A videoconference terminal used in a multipoint videoconference system constructed on an ATM network having a first communications channel and a second communications channel that is slower than the first communications channel, comprising:

a video camera which outputs a video signal;

a microphone which outputs a voice signal;

material data signal output means for outputting a material data signal which represents materials prepared for presentation in a videoconference, which materials include still images, text data, and mouse position data produced locally at the videoconference terminal, coding means for applying an MPEG coding process to the video signal and the voice signal to produce a coded video signal and a coded voice signal;

an ATM interface for performing signal processing necessary to transmit the coded video signal and the coded voice signal over the first communications channel, and the material data signal over the second communications channel, and for extracting reception signals from incoming ATM cells received from the first and second communications channels, wherein the incoming ATM cells contain video signals and voice signals, and material data signals that are collected and distributed by a videoconference server in the multipoint videoconference system;

decoding means for applying an MPEG decoding process to the signals extracted by said ATM interface and decode the received video signals and voice signals;

video displaying means for displaying images produced from the received material data signals on a monitor screen, together with motion images produced from the decoded video signals;

a speaker which produces a sound by transducing the voice reception signal obtained by said decoding means.

4. The videoconference terminal according to claim 3, further comprising material image selection means, responsive to the material data signal extracted by said ATM interface, for selecting one of material images sent from a plurality of videoconference terminals involved in a videoconference and providing the selected material image to said video displaying means.

5. A videoconference server used in a multipoint videoconference system constructed on an ATM network having first communications channels and second communications channels that are slower than the first communications channels, comprising:

an ATM interface receiver unit which extracts signals from ATM cells sent from a plurality of videoconference terminals via the ATM network, the extracted signals including a plurality of MPEG-coded video signals and a plurality of MPEG-coded voice signals that are sent over the first communications channels and a plurality of material data signals sent over the second communications channels, the material data signals including still images, text data, and mouse position data produced locally at the videoconference terminal, video decoding means for reproducing a plurality of decoded video signals by individually decoding the plurality of MPEG-coded video signals extracted by said ATM interface receiver unit;

video image creating means for creating a rearranged video signal by combining and rearranging the plurality of decoded video signals reproduced by said video decoding means;

video coding means for producing an MPEG-coded rearranged video signal by applying an MPEG coding process to the rearranged video signal created by said video image creating means;

voice decoding means for reproducing a plurality of decoded voice signals by individually decoding the plurality of MPEG-coded voice signals extracted by said ATM interface receiver unit;

voice signal creating means for creating a combined voice signal by combining the plurality of decoded voice signals reproduced by said voice decoding means;

voice coding means for producing an MPEG-coded combined voice signal by applying the MPEG coding process to the combined voice signal created by said voice signal creating means;

material data signal output means for outputting the plurality of material data signals extracted by said ATM interface receiver unit, each of which is affixed a source identification number indicative of which videoconference terminal produced the material data signal; and an ATM interface transmitter unit, coupled to said video coding means, said voice coding means, and said material data signal output means, for sending the MPEG-coded rearranged video signal and the MPEG-coded combined voice signal to the plurality of videoconference terminals over the first communications channels, and sending the plurality of material data signals having the identification numbers to the plurality of videoconference terminals over the second communications channels.

6. The videoconference server according to claim 5, wherein said material data signal output means comprises first output means for outputting the material data signals extracted by said ATM interface receiver unit, together with the source identification numbers, accumulating means for accumulating the material data signals extracted by said ATM interface receiver unit, together with the source identification numbers, and second output means for outputting the material data signals accumulated in said accumulating means to a videoconference terminal which has newly joined the present videoconference in session.

7. The videoconference server according to claim 5, wherein said material data signal output means comprises accumulating means for accumulating contents of the material data signals extracted by said ATM interface receiver unit, together with the source identification numbers, and output means for periodically outputting the material data signals accumulated in said accumulating means at predetermined intervals that would not affect other communication traffic.

8. The videoconference server according to claim 5, further comprising generation means for generating ending-notice information a predetermined time before a scheduled end time, wherein said ATM interface transmitter unit delivers the ending-notice information generated by said generation means to the plurality of videoconference terminals over the ATM network.

9. A videoconference administration server used in a multipoint videoconference system, comprising:

reservation means, activated by a reservation request signal sent from one of a plurality of videoconference terminals via an ATM network, for finding a vacant videoconference server from among the plurality of videoconference servers and making a reservation for a videoconference using said found videoconference server, and connection information transmission means, activated at a scheduled start time for the videoconference reserved by said reservation means, for calling participant videoconference terminals, setting up network connections, and transmitting connection information to the participant videoconference terminals over the ATM network, said connection information including information necessary for the participant videoconference terminals to connect to the reserved videoconference server, wherein said connection information transmission means includes:

calling means, activated at the scheduled start time for the videoconference reserved by said reservation means, for calling the participant videoconference terminals, repetitive calling means for repeatedly calling a particular participant videoconference terminal which does not respond to the calling means or returns a busy status signal to the calling means, and notification means for notifying the reserved videoconference server that said repetitive calling means keeps calling the particular participant videoconference terminal, and also for making the reserved videoconference server notify the other participant videoconference terminals that said repetitive calling means is calling the particular participant videoconference terminal.

10. The videoconference administration server according to claim 9, wherein said connection information transmission means comprises calling means, activated at the scheduled start time for the videoconference reserved by said reservation means, for calling the participant videoconference terminals, and notification means, activated when a particular videoconference terminal desires non-participation to the reserved conference, for notifying the reserved videoconference server of the non-participation of the particular videoconference terminal, and also for making the reserved videoconference server notify the other participant videoconference terminals of the non-participation.

11. The videoconference administration server according to claim 9, wherein said reservation means comprises cancellation means for canceling the reserved videoconference in response to a cancellation request signal received from the videoconference terminal that initiated the reservation via the ATM network.

\* \* \* \* \*